G. E. CARNEY.
CITRUS FRUIT JUICE EXTRACTOR.
APPLICATION FILED AUG. 25, 1920.
1,386,552.
Patented Aug. 2, 1921.
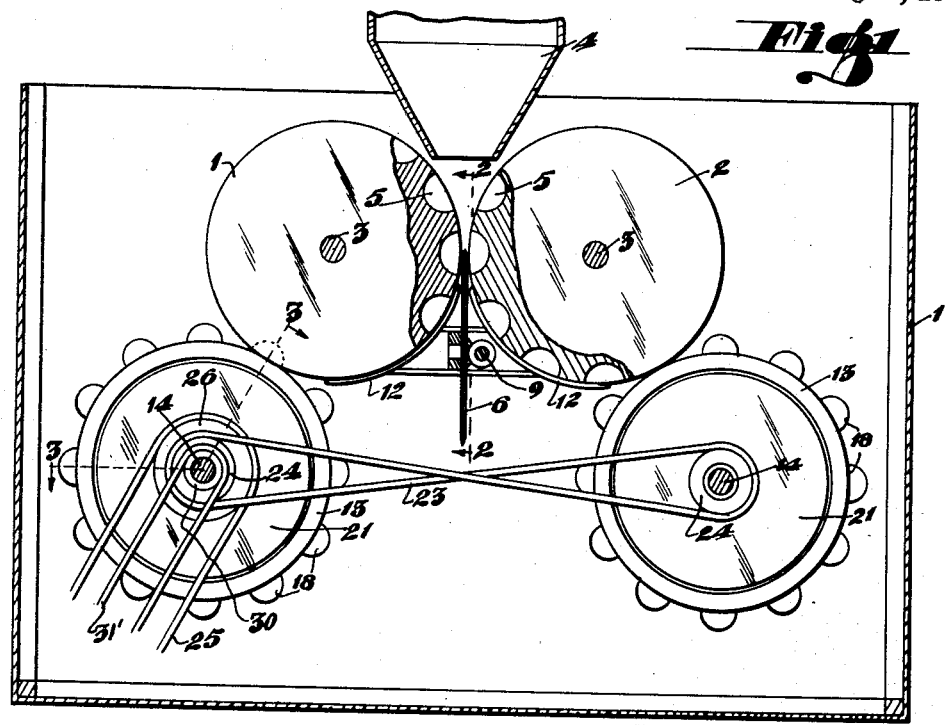
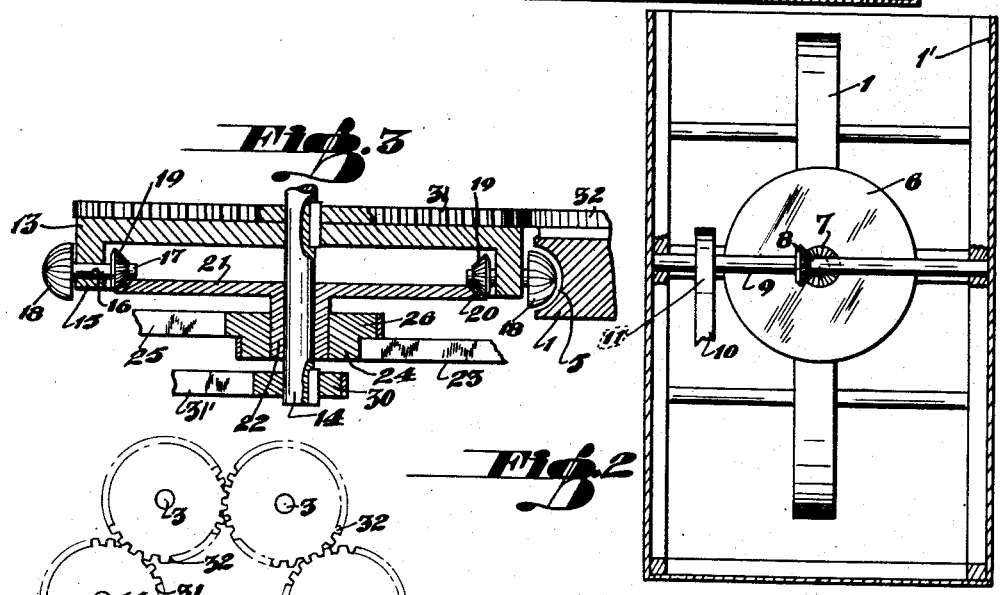
INVENTOR.
George E. Carney
BY
*Hazard & Miller*
ATTORNEYS

UNITED STATES PATENT OFFICE.

GEORGE E. CARNEY, OF LONG BEACH, CALIFORNIA.

CITRUS-FRUIT-JUICE EXTRACTOR.

1,386,552.  Specification of Letters Patent.  Patented Aug. 2, 1921.

Application filed August 25, 1920. Serial No. 405,848.

*To all whom it may concern:*

Be it known that I, GEORGE E. CARNEY, a citizen of the United States, residing at Long Beach, in the county of Los Angeles and State of California, have invented new and useful Improvements in Citrus-Fruit-Juice Extractors, of which the following is a specification.

It is the object of the present invention to provide a machine for extracting juices from citrus fruits and the like.

More specifically it is the object of the invention to provide a construction wherein the fruits are moved past cutting means for dividing the fruits, and juice expressing means are then brought into operative engagement with the divided fruits supported by suitable conveyers.

The invention will be readily understood from the following description of the accompanying drawings, in which Figure 1 is a front elevation of the machine with the outer casing broken away.

Fig. 2 is a detail transverse section on the line 2—2 of Fig. 1.

Fig. 3 is a transverse section on the line 3—3 of Fig. 1.

Fig. 4 is a rear elevation of the machine with the outer casing broken away.

The operating mechanism of the extractor is, preferably, mounted in a box-like receptacle 1' adapted to receive the extracted juices and also the rinds of the fruit.

The mechanism comprises rotatable members 1 and 2 mounted upon shafts 3 extending transversely of receptacle 1'. These rotatable members are arranged with the peripheries thereof adjacent one another, and a hopper 4 is arranged in the receptacle above the rotatable members so that fruits discharged through said hopper will drop on to the adjacent surfaces of the rotatable members. Recesses 5 are provided in the peripheral surfaces of rotatable members 1 and 2, said recesses of the respective members coöperating to form pockets in which individual fruits deposit upon the rotatable members are received. Rotation of members 1 and 2 in opposite directions will cause said fruits to be conveyed downwardly with the rotatable members.

A cutter shown as a rotary blade 6 is journaled below members 1 and 2 with the cutting edge of said blade extending upwardly between the adjacent peripheral surfaces of members 1 and 2. By this arrangement it will be seen that as the fruits in the pockets formed by recesses 5 are moved downwardly they will be severed by the blade 6 and the respective halves of the fruits positioned in the recesses 5 of the respective rotatable members.

Blade 6 may be rotated by means of a bevel pinion 7 fixed to said blade and operatively engaged by a bevel pinion 8 upon a shaft 9 extending transversely of receptacle 1'. The shaft 8 may be driven from any suitable source of power by a driving connection shown as including a belt 10 and pulley 11.

The divided fruits contained within recesses 5 are held within the same during the continued rotation of rotatable members 1 and 2 as by retaining strips 12 supported by receptacle 1' and extending along the peripheral surfaces of members 1 and 2 beyond cutter 6. By this arrangement, as the rotatable members are turned relative to strips 12 the halves of the fruits contained in recesses 5 will be retained therein by abutment against said strips.

Juice expressing means is provided for coöperation with the respective rotatable members so as to engage the fruits carried by the respective members beyond strips 12. These expressing means are shown as disks 13 fixed upon shafts 14 extending transversely of receptacle 1', the peripheries of said disks being positioned adjacent the peripheries of the respective rotatable members 1 and 2.

The disks 13 are provided with peripheral flanges 15 having bearings 16 extending through the same. Shafts 17 are journaled in these bearings and carry heads 18 at their outer ends arranged to coöperate with the respective recesses 5 and engage the fruits therein so as to express the juice from said fruits. The shafts 17 and the expressing heads 18 may be rotated by means of a driving connection comprising bevel pinions 19 upon the inner ends of shafts 17, said bevel pinions meshing with an annular bevel gear 20 carried by a disk 21 which is fixed to a sleeve 22 loosely journaled upon shaft 14.

The sleeves 22 of the expressing means employed in conjunction with the respective rotatable members 1 and 2 may be connected for dependent reverse rotation as by means of a crossed belt 23 received over pulleys 24 upon the respective sleeves. A driving connection for the sleeves from a suitable source of power may be provided by a belt 25 received over a pulley 26 upon one of the sleeves.

The driving mechanism for rotating disks 13 and the rotary members 1 and 3, preferably, includes a pulley 30 fixed upon one of the shafts 14 and having the belt 31' leading from a suitable source of power received over the same. Gears 31 are fixed upon shafts 14 and gears 32 are fixed upon the shafts 3 carrying the rotatable members 1 and 2. These gears intermesh so that the gear 31 carried by the shaft 14 having the driving connection 30—21 will mesh with one of the gears 32. This gear in turn meshes with the other gear 32 and the latter meshes with the gear 31 carried by the second of the shafts 14. By this arrangement rotatable members 1 and 2 will be rotated in opposite directions to provide the conveyer for the fruits, and the disks 13 will be rotated in the opposite direction to that of the rotatable members with which they coöperate.

Various changes may be made without departing from the spirit of the invention as claimed.

What is claimed is:

1. In a fruit juice extractor, a rotary member provided with pockets adapted to receive fruit, and a series of revoluble, rotatably mounted members adapted to enter said pockets to squeeze the juice from the fruit positioned therein.

2. The combination with rotary recessed members coöperating to form conveyer pockets, of means for expressing the juices from the articles positioned in the recesses of the respective members.

3. The combination with rotary recessed members coöperating to form conveyer pockets, of means for expressing the juices from the articles positioned in the recesses of the respective members, and dependent driving means for said rotary members.

4. The combination with rotary recessed members coöperating to form conveyer pockets, of cutting means for dividing the articles conveyed, and means for retaining the divided articles in the recesses of said members.

5. The combination with rotary recessed members coöperating to form conveyer pockets, of cutting means for dividing the articles conveyed, and means for expressing the juices from the divided articles positioned in the recesses of said members.

6. The combination with a conveyer, of a rotary support, and juice expressing means carried by said support and adapted to be successively brought into engagement with the articles carried by said conveyer.

7. The combination with a conveyer, of a rotary support, juice expressing means carried by said support and adapted to be successively brought into engagement with the articles carried by said conveyer, and means for rotating said juice expressing means upon radial axes.

In testimony whereof I have signed my name to this specification.

GEORGE E. CARNEY.